United States Patent [19]

Dirks

[11] 3,944,704
[45] Mar. 16, 1976

[54] COMPOSITE STRUCTURE

[75] Inventor: Chauncey L. Dirks, Metamora, Mich.

[73] Assignee: The John Z. DeLorean Corporation, Bloomfield Hills, Mich.

[22] Filed: Oct. 31, 1974

[21] Appl. No.: 519,496

[52] U.S. Cl. ............... 428/305; 156/295; 156/308; 156/313; 264/45.1; 264/46.4; 264/321; 428/311; 428/315
[51] Int. Cl.² .......................................... B32B 3/26
[58] Field of Search ...... 161/159, 160, 161; 156/77, 156/295, 308, 313; 428/310, 305, 311, 315; 264/45.1, 46.4, 321

[56] References Cited
UNITED STATES PATENTS

| 3,193,441 | 7/1965 | Schafer | 428/311 |
| 3,194,708 | 7/1965 | Fourcade et al | 161/161 |
| 3,400,196 | 9/1968 | LeRoy | 428/310 |
| 3,516,675 | 6/1970 | Kuester et al | 161/161 |
| 3,867,221 | 2/1975 | Chant | 156/77 |

Primary Examiner—William J. Van Balen
Attorney, Agent, or Firm—Reising, Ethington, Barnard, Perry & Brooks

[57] ABSTRACT

The invention relates to a composite structure comprising plural open-cell foam phases impregnated with a hardenable resin such that the cells of one phase are filled with the cured resin while the cells of another phase are coated but unfilled with the resin.

13 Claims, 6 Drawing Figures

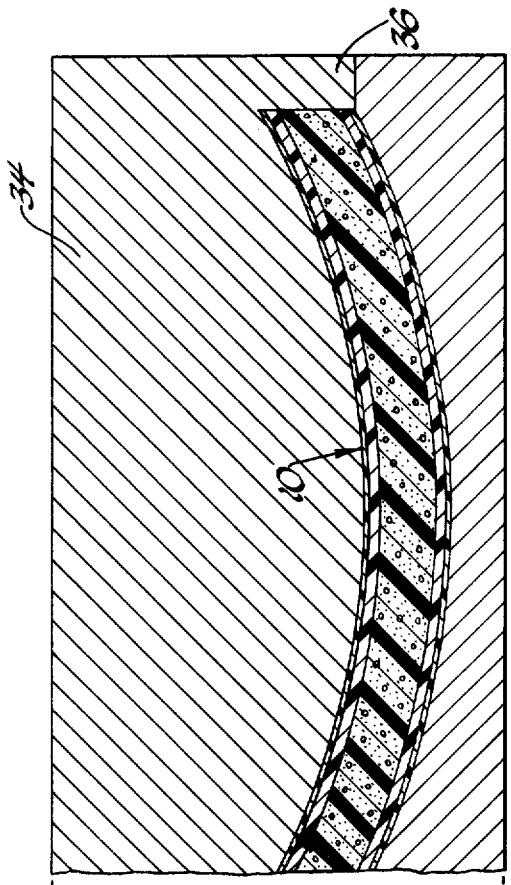
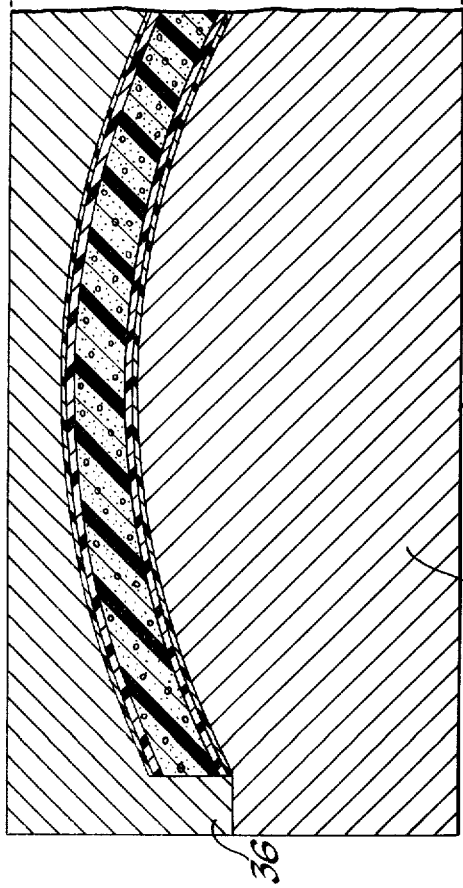
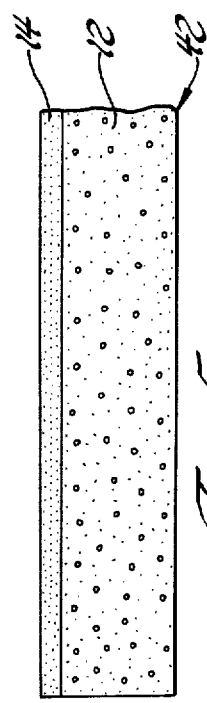
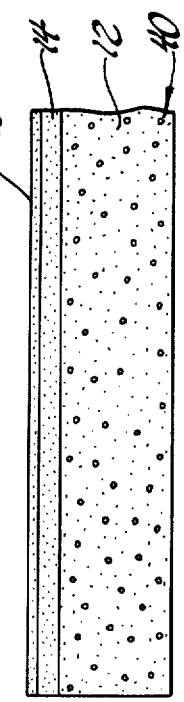

COMPOSITE STRUCTURE

BACKGROUND OF THE INVENTION

1. Field of the Invention

The subject matter of the invention relates to the construction and method of fabricating laminated structures of the type wherein a plurality of materials are joined together to provide an integral structure having the composite physical and chemical characteristics of the materials utilized. The invention is more specifically concerned with composites predominantly utilizing synthetic or nonmetallic materials, such as high strength fibers, open-cell resinous foams, and thermosetting resins.

As new combinations of materials are sought in composite laminar structures, frequent difficulty is experienced both in initially bonding the materials together and also in maintaining laminar integrity in subsequent use. Particularly where mechanical rather than chemical bonding is relied upon in fabricating laminated structures, delamination in use is a common problem. As more or different laminar or sheet materials are employed, interface bond strength is affected not only by the chemical compatibility between the laminates and the bonding material but also by certain physical characteristics such as dissimilar coefficients of expansion. It is also important to composite integrity that discrete laminar interfaces be eliminated and that composite penetration by deleterious liquids be prevented. It is found that the fewer chemically and physically dissimilar materials used and the fewer molding steps required in forming laminar composites, the greater likelihood of maintaining the ultimate integrity of the resultant structure.

One of the most broadly promising applications for the use of composite structures comprised mainly of plastic or synthetic materials is as lighter weight and less costly alternatives to many metallic structures. Nowhere is this promise greater than with respect to building vehicle bodies and components for use on land, sea or in the air.

Factors such as material and labor costs, reduced energy consumption, improved human comfort and safety and increased product durability offer increased incentives for the use of plastic or synthetic materials to replace metal. Today reinforced or composite plastic materials increasingly are being utilized in vehicle bodies and in other structural applications as direct substitutes for metal.

In addition to eliminating corrosion, plastic or resin based composites offer the opportunity of significantly reduced vehicular weight thereby lowering fuel consumption and also providing improved sound and thermal insulation qualities for enhanced passenger comfort. It is the purpose of the present invention to provide composite structures to more effectively achieve these and other objectives.

One of the important concepts of the present unique composite structure is in utilizing plural layers of chemically compatible open-cell foam materials having substantially different compressive resistances whereby during a single low pressure molding operation differing amounts of cured resin are retained in the various foam layers.

DESCRIPTION OF THE PRIOR ART

Schafer U.S. Pat. Nos. 3,193,437 and 3,193,441 illustrate the concept of an initially resilient and open-cell foam material impregnated with a thermosetting resin, used alone or in combination with reinforcing fibers, and wherein a foam layer is compressed so that the thermosetting resin substantially fills the cells of the foam and which resin is cured while maintaining the foam layer in a compressed condition. The resultant composite structure, while having reasonable physical strength, has relatively poor thermal and sound insulating characteristics and generally lacks rigidity, which latter qualities are more effectively achieved with an open-cell construction having entrained pockets of air.

Windecker U.S. Pat. No. 3,269,887 discloses the use of a single layer open-cell foam material impregnated with a thermosetting resin and cured to provide a lightweight composite material of an open-cell construction. Windecker also discloses bonding a reinforcing layer to his pre-formed hardened foam. Where Windecker seeks to provide a composite structure impermeable to liquids, the patentee resorts to a float device such as shown in his U.S. Pat. No. 3,467,345 wherein either the foam core is first molded and a hardened skin thereafter applied to the hardened foam, or, a hardened skin is pre-formed and the foam variously inserted within the skin.

The prior art fails to teach or suggest an integrally molded composite structure comprised of a plurality of initially open-cell foam layers in combination with a thermosetting resin for bonding the layers together and concomitantly filling substantially all the cells of one foam layer while providing a thin resin film coating about the cells of the other layer whereby most of the latter cells remain unfilled with resin. More specifically, the prior art does not disclose the concept of combining initially open-cell foam layers having different resistances to compression which enables a thermosetting resin to fill the cells of one foam layer while merely coating but not filling most of the cells of the other foam layer and all of which may be achieved in a single molding step.

Neither does the prior art disclose a laminar composite having plural layers of open-cell materials of differing compressive resistances in combination with a high strength reinforcing layer wherein all layers are permeated by and bonded together with a thermosetting resin matrix which extends throughout the structure to eliminate discrete laminar interfaces.

SUMMARY OF THE INVENTION

Through a unique combination of materials, composite structures made in accordance with the present invention are formable in a single molding step, are moldable with small radius curvatures, are impervious to liquids, have good sound and thermal insulation characteristics, and are highly resistant to delamination.

The subject laminar composites begin with a plurality of layers of initially resilient and open-cell foam material, e.g. polyurethane, and which layers are impregnated to varying degrees with an uncured thermosetting resin. At least two of the foam layers must have substantially different compressive resistances. In other words, at least one of such layers has a relatively low compressive resistance, i.e., it is relatively "soft", while another layer has a relatively high compressive resistance, i.e., it is relatively "stiff". Even though characterized as soft or stiff relative to each other, all of the open-cell foam layers are sufficiently resilient or elastic to be easily moldable in a broad range of configurations.

Each of the foam layers has an open-cell construction, that is, adjacent cells are initially in open communication with each other so as to be impregnatable with the uncured thermosetting resin. Where increased strength is required, a layer of high strength reinforcing filaments or fibers, such as fiberglass, is disposed adjacent the relatively soft foam layer. As the foam layers are subjected to a controlled compression load during the molding operation, the soft layer is substantially reduced in thickness causing now excess and uncured resin to be expelled into the interstices of the high strength fiber layer so as to completely imbed the fiber layer in the resin matrix. During such compression substantially all of the cells of the soft foam layer are completely filled with resin. At the same time, the cells of the relatively stiff foam layer, while coated with a thin film of resin during the impregnation step, compress to a far lesser extent with the result that after curing of the resin most of the cells of this layer remain coated or surrounded but unfilled within a now rigidified resin matrix. The result of this construction is a composite structure having a high strength reinforcing layer, a greatly compressed liquid-impervious layer of foam material with substantially all of its cells completely filled with cured thermosetting resin and a third layer having resin coated but unfilled cells.

The number of layers utilized in making a composite structure in accordance with the invention can be varied depending on the ultimate physical characteristics required. However, it is basic to the invention that the composite include at least two initially elastic or resilient foam layers having open and interconnected cells and with one of these layers having a resistance to compression substantially less than the other layer. The resilient foam may be a polyurethane foam or any other suitable elastic open-cell material. White it is preferred that the foam layers have the same chemical composition, different foam materials may be used so long as they are chemically compatible with each other and with the bonding resin.

Referring to the drawings:

FIG. 3 illustrates a mold for forming a composite structure.

FIGS. 4 and 5 illustrate further embodiments of the invention; and

FIG. 6 shows a composite structure integrally formed with various types of inserts.

Figure 1:
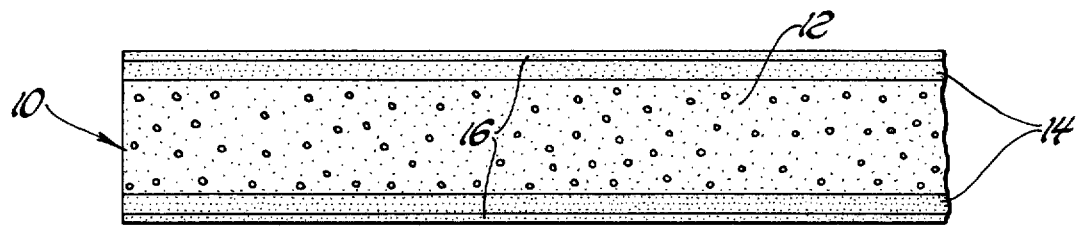
FIG. 1 shows a composite structure made in accordance with the invention.

An illustrative composite structure is shown generally at 10 in FIG. 1 and includes a foam core comprising a first foam layer 12, two adjacent foam layers 14 and outer reinforcing layers 16. Layer 12 and layers 14 are preferably of the same chemical composition, e.g., polyurethane, or are materials sufficiently compatible as to preclude any adverse chemical reactions between layers or between the layers and the bonding resin.

Typical of polyurethane foam materials which may be used are those sold by the Firestone Tire Co. and identified as P-1014 and P-2845. A significant difference in these foams is their resistance to compressive loads. P-1014 is described by the manufacturer as weighing 1.0 pounds per cubic foot of density and as having 14 pounds resistance over a 50 square inch area. P-2845 is described as weighing 2.8 pounds per cubic foot of density and as having 45 pounds resistance over a 50 square inch area. The compression resistance specification is measured in accordance with A.S.T.M. Standardized Methods Specification No. D 1564-71 or 72. It is apparent from the foregoing specifications and descriptions that the cells of layers 14 are substantially larger than those of layer 12.

While both are initially elastic or resilient and therefore easily formable, in relationship to each other layer 14 may be characterized as soft and layer 12 as stiff.

In referring to the foam materials as having open cells it is meant that initially or before molding substantially all of the cells are in open communication with the other cells so that the foam can be impregnated throughout with a liquid resinous material.

Figure 2A:
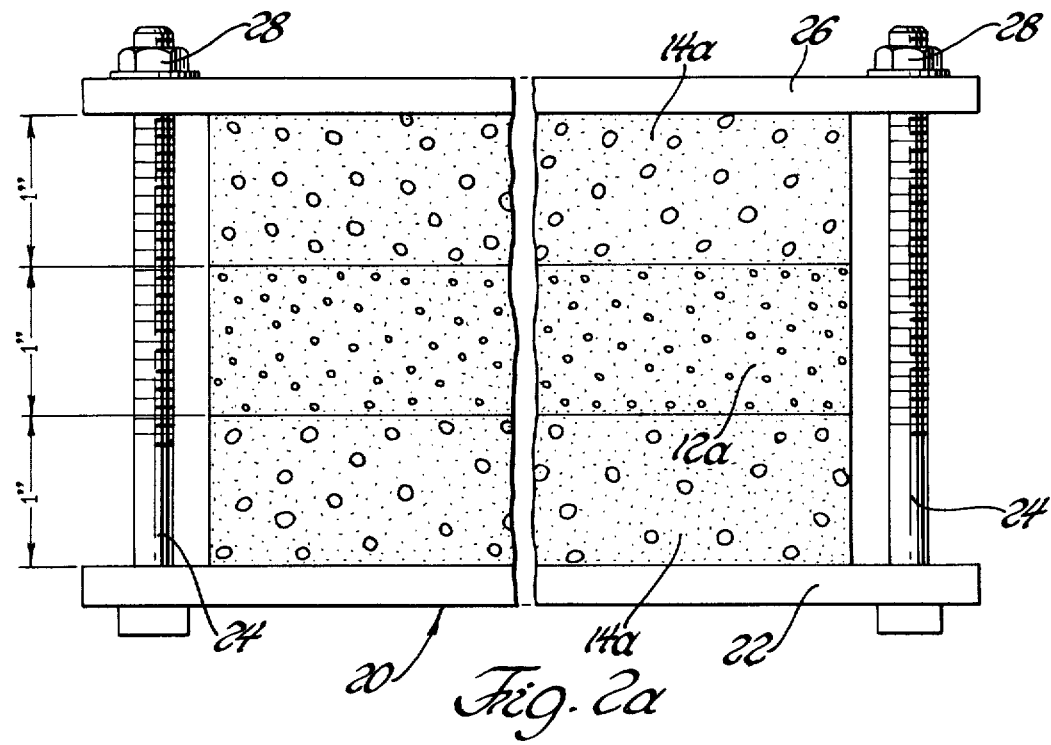
FIGS. 2a and 2b represent a test fixture to illustrate the relative compressibility of different foam layers.
Figure 2B:
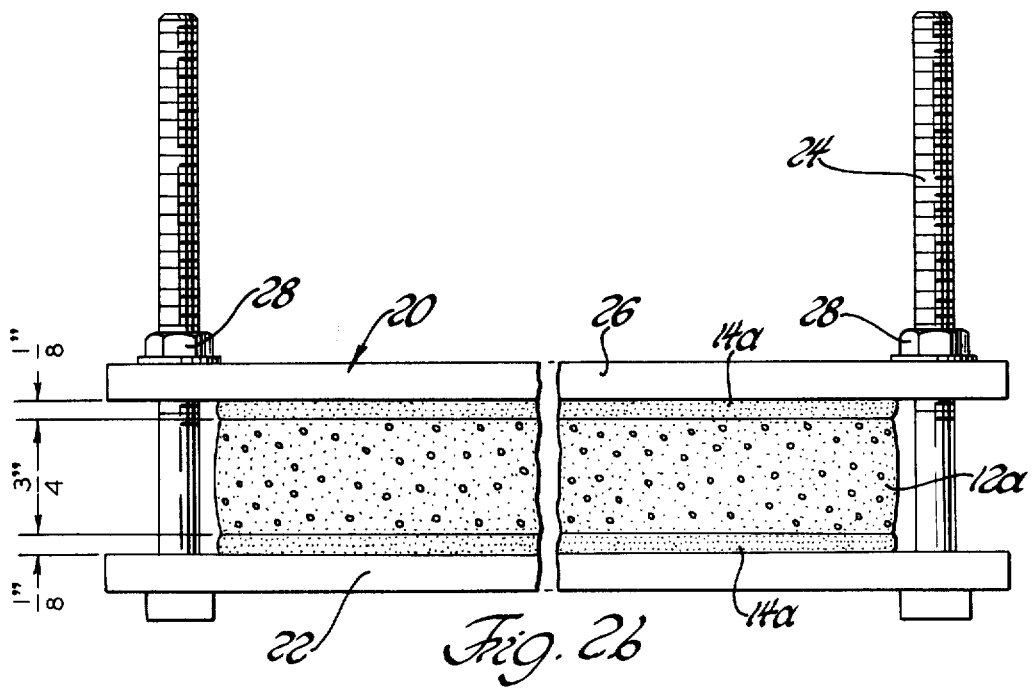

FIGS. 2a and 2b disclose a fixture 20 for demonstrating the relative compressibility of the soft and stiff foam layers 12a and 14a respectively utilizing Firestone polyurethane materials P-1014 and P-2845. Fixture 20 includes a lower platen 22 fixed relative to threaded bolts 24, an upper platen 26 slidably supported upon the bolts and retained thereon by nuts 28. FIG. 2a shows the fixture loaded with three layers 12a and 14a of resilient polyurethane foam of initially equal thicknesses, e.g., one inch each. In FIG. 2a, upper platen 26 is merely resting on the foam layers. In FIG. 2b, nuts 28 have been threaded downwardly, causing upper platen to variously compress the foam layers. The substantially different resistances to compression of materials P-1014 and P-2845 cause layers 14a each to be reduced to a one-eighth (⅛) inch thickness or by 87.5 per cent while layer 12a is reduced only slightly to three-fourths (¾) inch thickness or by 25 per cent. As will be more apparent subsequently, the degree of compressibility of each foam layer affects the extent to which the uncured resin fills or coats the open cells of each layer.

It is to be understood that the original foam layer thicknesses depicted in FIGS. 2a are merely illustrative and may be varied depending on the ultimate physical properties desired.

In the embodiment of FIG. 1, reinforcing layers 16 are comprised of high tensile strength filaments or fibers such as fiberglass. Depending on the ultimate physical properties required or the shape to be molded, the fiber layer may assume various forms such as a chopped strand mat, a continuous swirl mat, a multi-direction or a uni-direction cloth. For example, if the shape to be molded includes relatively tight radius curvatures, it is preferable to use a continuous swirl mat of fiberglass fibers. During molding such a mat conforms closely to a tightly curved surface and avoids wrinkling or bunching sometimes associated with a cloth layer. The form selected for the reinforcing layer 16 will depend on factors such as the configuration to be molded, tensile strength and surface finish. In any event, the reinforcing layer should be such as to permit its being permeated throughout its thickness by the bonding resin during the molding and curing process.

The bonding resin is of a thermosetting type. Polyester or epoxy resins have been successfully used for the intended purpose and are of the types commonly used today in making fiber reinforced boat hulls and vehicle bodies. As will be more apparent when the method of forming the composite is described subsequently, after the molding and curing have been completed, the cured resin extends throughout all layers and surfaces of the composite forming what may be termed a continuous resin phase or matrix. In thus extending throughout the composite, the continuous resin phase eliminates discrete interfaces between laminations and thereby greatly reduces the possibility of delamination in use.

In the cured composite structures of FIGS. 1, 4, 5 and 6, foam layers 14 are substantially reduced in thickness from their initial size due to being compressed during the molding and curing process. Due to such compression, substantially all of the cells of layer or layers 14 are completely filled with the hardened resin. Likewise the interstices of reinforcing layer or layers 16 are also filled with the hardened resin. In thus filling the cells of compressed layer 14 with cured resin, a hard and liquid-impervious layer is created. Such impermeability is also an important factor in avoiding delamination in subsequent use. In those cases where both faces of the composite may be subjected to moisture, it is preferred that compressed foam layers 14 be disposed on both exposed faces of layer 12.

To better understand composite structure 10 depicted in FIG. 1, a process by which the composite may be fabricated will now be described. Open-cell layers 12 and 14 are first impregnated with the uncured thermosetting resin, as for example, by dipping or passing each layer through a tank or container of the liquid resin. If the molding process promptly follows the impregnating step, the resin in the tank will also contain a catalyst whereby curing will begin upon the application of heat. If an intermediate storage period is contemplated, the catalyst will be added subsequently. To control the amount of resin retained therein, each foam layer is passed through a roller device whereby excess resin is squeezed out. Since it is ultimately desired to completely fill the cells of layers 14 and to provide sufficient resin to impregnate reinforcing layer 16, layers 14 are only lightly squeezed after impregnation. Since it is desired that most of the cells of the less resilient foam layer 12 remain coated but unfilled after molding and curing, this layer is squeezed sufficiently to insure the wetting of all of its cells while removing all excess resin.

After the impregnating and squeezing steps the various layers 12, 14 and 16 are stacked in the lower half 32 of a mold 30 such as illustrated in FIG. 3, after which the upper half 34 of the mold is closed to apply a compressive force to the sandwich and heat applied to cure the resin. Upper mold member 34 includes stop portions 36 to limit the extent to which the foam layers are compressed.

As illustrated in the fixture of FIG. 2b, soft layers 14 are more compressible than layer 12 and are heavily impregnated with resin; thus, when subjected to compression loading within mold 30, layers 14 are substantially reduced in thickness thereby insuring filling of the cells and expelling the excess resin to fully impregnate reinforcing layer 16. Since layer 12 undergoes relatively little compression during the molding process, most of its cells are coated with a thin film of cured resin but remain open.

While the invention has been illustrated utilizing two open-cell layers 14 and two reinforcing layers 16, other combinations are comprehended within the scope of the invention. For instance, where only one high strength reinforced outer surface will suffice, a composite 40 such as shown in FIG. 4 may be made. In this case the composite includes one reinforcing layer 16, one substantially compressed foam layer 14 and an open-cell layer 12.

Where the added strength of one or more reinforcing layers is not required and further where one liquid-impervious layer is adequate, a composite 42 may be constituted as shown in FIG. 5. In this case the composite is comprised of the compressed foam layer 14 having its cells filled with cured resin and a substantially open-cell layer 12 both contained within a continuous resin matrix.

In all embodiments illustrated the molding process is basically the same and results in a rigidified composite structure.

The ability to combine initially elastic foam layers as heretofore described also permits the integral incorporation into the composite structure of a variety of functional elements which otherwise would have to be exteriorly and subsequently attached to the finished composite structure. The advantages of this further capability is to reduce fabricating the construction costs while protecting the functional element or elements and enhancing the aesthetic quality of the structure being fabricated. FIG. 6 illustrates a variety of functional elements which can be thus incorporated.

In the embodiment illustrated in FIG. 6 the basic composite structure 44 is similar to that shown in FIG. 1 and includes external reinforcing layers 16, compressed and resin-filled layers 14 and the coated but unfilled foam core 12. In forming the composite sandwich and prior to the molding and curing step, various functional elements may be incorporated within the open-cell layer 12. Such elements can include, for example, a fluid conduit 46, a stiffening or reinforcing member 48, electrical wiring 50 or tubing 52.

Various references have been made throughout the foregoing description and in the drawings to layers of initially resilient open-cell foams. Such layers have been illustrated as being initially separate. It is within the scope of this invention to employ an integral sheet of open-cell foam material wherein said sheet includes adjacent layers or portions having substantially different resistances to compression. This can be achieved by forming an integral or one-piece open-cell material which includes a layer of larger open cells and another layer of small open cells wherein one layer would be soft and highly compressible with respect to the other.

The embodiments of the present invention in which an exclusive property or privilege is claimed are defined as follows:

1. A composite structure comprising a plurality of layers of initially resilient materials having open and connected cells, at least two of said layers having substantially different initial compressive resistances, a layer of high strength filaments overlaying the open-cell layer of lesser compressive resistance, a thermosetting resinous material impregnating the open-cell layers, said resinous material having been cured while maintaining the layers of resilient material and high strength filaments under compression whereby the cured resinous material is disposed as a continuous and rigid phase, throughout all of said layers.

2. A composite structure comprising a core section, said core section including a plurality of layers of initially resilient open-cell material, at least one of said layers initially having a substantially lower resistance to compression than another of said layers, a layer of high strength reinforcing filaments disposed proximate the lower compression resistance layer, and a thermosetting resin impregnating said open-cell layers, said resin being cured while maintaining said open-cell and reinforcing layers under compression sufficient to substantially reduce the original thickness of said lower compression resistance layer, said cured resin forming a continuous bonding matrix extending across the thickness of said structure.

3. A composite structure as set forth in claim 2 wherein said cured resin completely fills substantially all of the cells of the lower compression resistance layer.

4. A composite structure comprising a multi-phase construction, a first phase comprising an initially resilient material having open and connected cells, said resilient material including adjacent portions having substantially different initial compressive resistances, a second phase comprising a layer of high strength filaments disposed adjacent that portion of the resilient material having the lesser compressive resistance, and the third phase comprising a hardenable resin, said resin phase being cured while maintaining all three phases under compression whereby said cured resin phase is continuous throughout said structure and maintains said first phase in a compressed and rigidified condition.

5. A composite structure as set forth in claim 4 wherein the cured third phase resinous material fills substantially all the cells of that portion of the resilient material having the lesser compressive resistance.

6. A composite structure as set forth in claim 5 wherein the cured third phase resinous material provides a thin coating on the cells of that portion of the resilient material having the greater compressive resistance.

7. A composite structure comprising first and second layers of initially resilient material, each of said layers having open and connected cells, said first layer having a resistance to compression substantially less than that of said second layer and a thermosetting resin impregnating both of said layers, said resin being cured while maintaining said layers under compression sufficient to substantially reduce the thickness and fill the cells of said first layer, the cells of said second layer being coated with a thin film of cured resin whereby most of said latter cells remain unfilled by the cured resin.

8. A composite structure comprising initially resilient first and second foam phases, each of said foam phases including open cells, and a hardened resin phase extending throughout said first and second foam phases, said resin phase filling substantially all of the cells of said first foam phase, most of the cells of said second foam phase being coated with a thin film of said resin phase whereby most of said latter cells remain unfilled by said resin phase.

9. A composite structure ass set forth in claim 8 wherein said hardened resin phase is a thermosetting resin.

10. A composite structure as set forth in claim 8 wherein said first foam phase is substantially compressed relative to said second foam phase.

11. The method of forming a composite structure having at least two layers of initially resilient, open-cell foam materials bonded together and rigidified by a thermosetting resin, said method comprising:
 a. impregnating each of said layers with an uncured thermosetting resin so as to wet substantially all of the cells of said foam layers;
 b. stacking said resin-impregnated layers;
 c. subjecting said stacked layers to compression sufficient to fill with uncured resin substantially all the cells of one foam layer while leaving wetted but unfilled substantially all the cells of said other foam layer; and
 d. curing said resin while maintaining said stacked layers under compression.

12. The method of forming a composite structure comprising:
 a. impregnating first and second layers of open-cell resilient materials with an uncured hardenable resin;
 b. stacking said layers;
 c. subjecting said stacked layers to a molding pressure sufficient to
  1. substantially reduce the thickness of said first layer to thereby fill substantially all the cells of said first layer with the uncured resin,
  2. leave wetted but unfilled with uncured resin most of the cells of said second layer; and
 d. curing said resin while maintaining said stacked layers under said molding pressure.

13. The method of forming a composite structure having at least two layers of initially resilient, open-cell foam materials, a layer of reinforcing elements, and a resin matrix bonding said layers together, said method comprising:
 a. impregnating each of said foam layers with an uncured thermosetting resin so as to wet substantially all of the cells of said foam layers;
 b. stacking said resin-impregnated layers and a layer of reinforcing elements;
 c. subjecting said stacked layers to compression sufficient to
  1. substantially reduce the thickness of one foam layer so as to fill substantially all the cells thereof with uncured resin and to imbed the layer of reinforcing elements in resin expelled form said reduced layer,
  2. leave wetted but unfilled with resin most of the cells of the other foam layer; and
 d. curing said resin while maintaining said stacked layers under compression.

* * * * *